United States Patent
Ganschow et al.

(10) Patent No.: US 6,451,146 B1
(45) Date of Patent: Sep. 17, 2002

(54) ADHESIVE TAPE BASED ON A WEB THERMALLY BONDED WITH FUSIBLE FIBRES

(75) Inventors: Frank Ganschow, Elmshorn; Klaus Külper, Pinneberg, both of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/407,433

(22) Filed: Sep. 29, 1999

(30) Foreign Application Priority Data

| Oct. 24, 1998 | (DE) | 198 49 052 |
| May 8, 1999 | (DE) | 199 21 408 |
| May 21, 1999 | (DE) | 199 23 399 |

(51) Int. Cl.⁷ .............. A41B 13/00; C09J 7/04; D04H 1/44; D04H 1/48
(52) U.S. Cl. ............ 156/164; 156/166; 428/343; 428/352; 442/364; 442/401; 442/415; 442/374; 427/207.1; 427/208.4
(58) Field of Search ............... 428/343, 352; 442/364, 401, 415, 374; 427/207.1, 208.4; 156/166, 164

(56) References Cited

U.S. PATENT DOCUMENTS

| 4,587,152 A | 5/1986 | Gleichenhagen et al. |
| 5,496,603 A | * 3/1996 | Riedel et al. ........... 428/40 |
| 5,629,078 A | 5/1997 | Ganschow |
| 5,631,073 A | 5/1997 | Riedel et al. |
| 6,107,219 A | * 8/2000 | Joseph et al. .......... 442/361 |

FOREIGN PATENT DOCUMENTS

| DE | 33 46 100 A1 | 7/1985 |
| DE | G 94 01 037.4 | 4/1994 |
| DE | 43 13 008 C1 | 11/1994 |
| DE | 44 42 092 A1 | 5/1996 |
| DE | 44 42 093 A1 | 5/1996 |
| DE | 44 42 507 A1 | 6/1996 |
| DE | 195 23 494 A1 | 1/1997 |
| DE | 195 23 494 C2 | 4/1998 |
| DE | 298 04 431 U1 | 9/1998 |
| DE | 298 19 014 U1 | 4/1999 |
| EP | 0 578 151 A1 | 7/1993 |

* cited by examiner

Primary Examiner—Daniel Zirker
Assistant Examiner—Victor S. Chang
(74) Attorney, Agent, or Firm—Norris McLaughlin & Marcus

(57) ABSTRACT

Adhesive tape having a tapelike backing of nonwoven material, which is coated on at least one side with an adhesive, the nonwoven web being a staple fiber web which is mechanically consolidated or wet-laid, between 2% and 50% of the fibers of the web being fusible fibers.

9 Claims, 1 Drawing Sheet

ADHESIVE TAPE BASED ON A WEB THERMALLY BONDED WITH FUSIBLE FIBRES

Figure 1:
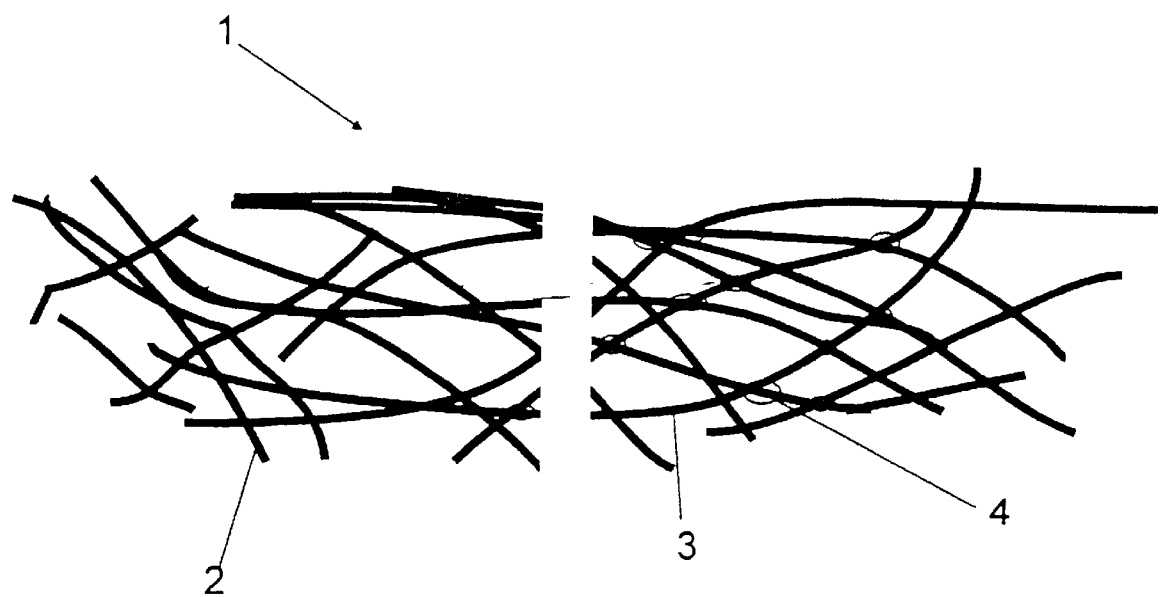

The invention relates to an adhesive tape having a tapelike backing comprising a nonwoven material which is thermally bonded with fusible fibres and is coated on at least one side with an adhesive, and to its use.

Adhesive tapes having a tapelike backing based on wovens or stitchbonded webs are known, woven tapes having been obtainable for a relatively long time and tapes having a stitchbonded web backing being described, for example, in DE U 94 01 037. Pressure-sensitive adhesive coatings are preferably employed as the adhesive coating.

DE 44 42 092 describes such an adhesive tape, based on stitchbonded web, which is coated on the reverse of the backing. DE 44 42 093 is also based on the use of a web as backing for an adhesive tape; in this case, a cross-laid fibre web is described which is reinforced by the formation of loops from the fibres of the web; i.e. a web known to the person skilled in the art as Malifleece. DE 44 42 507 likewise discloses an adhesive tape for cable bandaging, but bases it on so-called Kunit or Multikunit webs.

DE 195 23 494 C discloses the use of an adhesive tape having a backing comprising nonwoven material for bandaging cable harnesses, the said tape being coated on one side with an adhesive. The web employed in accordance with the invention is a spunbonded web of polypropylene, which is thermally consolidated and embossed with the aid of a calender, the embossing roll having an embossing surface of from 10% to 30%, preferably 19%.

DE 298 04 431 likewise discloses the use of an adhesive tape having a backing comprising nonwoven material for the bandaging of cable harnesses, the proposed spunbonded web consisting of polyester.

DE 298 19 014 U1 discloses adhesive tapes based on a web which is consolidated with air and/or water jets. The disadvantage of this backing, despite the mechanical consolidation, is that it is impossible by this technique to rule out the extraction of individual long threads and an adverse effect on the adhesive properties. In the case of very extensive consolidation of the individual fibres, other advantageous backing properties, especially for the harnessing of cables in cars, can no longer be obtained.

Adhesive tapes having a woven backing satisfy stringent technical requirements but are laborious to produce, are expensive, and have a tendency for the adhesive composition to strike through. Adhesive tapes having stitchbonded web backings, although simple in their construction, nevertheless show considerable disadvantages in practical use, such as problems owing to the heterogeneous web structure with reinforcing parallel stitches. Furthermore, the production rate of this technology is limited even with modern high-performance units.

Furthermore, with a single-sided adhesive tape having a conventional Malifleece as backing material, i.e. a Malifleece not thermally bonded, it is necessary to treat the reverse in order to prevent delamination of the backing and/or extraction of individual fibres or tufts of fibres from the surface, especially in the course of unwinding from the roll. Alternatively, this objective can be obtained by introducing a release paper between the individual plies of adhesive tape during the winding operation of the adhesive tape roll. In the case of stitchbonded or otherwise mechanically consolidated webs (needlefelts or air and/or water jet consolidated webs), the individual fibres of the web, although mechanically consolidated (stitched), are nevertheless still displaceable with respect to one another and can be torn out individually under stresses. This applies both to fibres in the sheetlike backing and, quite particularly, to fibres at the surfaces.

Unless additional improvements are ensured at this point in the production process of backing and/or adhesive tape, the fibres torn out during the unwinding of the adhesive tape roll have a marked adverse effect on the adhesive properties of the adhesive tape. They are responsible for poor visual qualities and may even ruin the entire functional capacity of the adhesive tape.

The object on which the present invention is based is therefore to improve an adhesive tape in such a way that the disadvantages of the prior art do not occur to the same extent if at all.

This object is achieved by means of an adhesive tape as specified in the main claim. The subclaims relate to advantageous developments of the adhesive tape and to a particularly advantageous use thereof.

The invention accordingly provides an adhesive tape having a tapelike backing of nonwoven material, which is coated on at least one side with an adhesive, the nonwoven web being a staple fibre web which in a first step is mechanically consolidated, or else a wet-laid web which is laid hydrodynamically, between 2% and 50% of the fibres of the web being fusible fibres, in particular between 5% and 40% of the fibres of the web.

The web is characterized in that the fibres are wet-laid or, for example, a staple fibre web is consolidated by the formation of loops from fibres of the web or by needling, stitching or air and/or water jet treatment. A second step comprises thermal bonding, in which the strength of the web is increased further by the thermal partial melting of the fusible fibres. In this way it is also possible to achieve a marked reduction in the extraction of individual filaments from the surface, which is particularly critical for the use of adhesive tape rolls.

Consolidated webs are produced, for example, on stitchbonding machines of the "Malifleece" type from Malimo and can be obtained, inter alia, from Naue Fasertechnik and from Techtex GmbH. A Malifleece is characterized in that a cross-laid web is consolidated by the formation of loops from fibres of the web.

The backing used can also be a web of the Kunit or Multikunit type. A Kunit web is characterized in that it originates from the processing of a longitudinally oriented fibre web to form a sheetlike structure which has the heads and legs of loops on one side and, on the other, loop feet or pile fibre folds, but possesses neither filaments nor prefabricated sheetlike structures. A web of this kind has also been produced for many years, for example, on stitch-bonding machines of the "Kunitvlies" type from the company Karl Mayer, formerly Malimo. A further characterizing feature of this web is that, as a longitudinal-fibre web, it is able to absorb high tensile forces in the lengthwise direction. The characteristic feature of a Multikunit web relative to the Kunit web is that the web is consolidated on both the top and bottom sides by virtue of the double-sided needle punching. Finally, stitchbonded webs are also suitable for forming an adhesive tape of the invention. A stitchbonded web is formed from a nonwoven material having a large number of stitches extending parallel to one another. These stitches are brought about by the incorporation, by stitching or knitting, of textile filaments. For this type of web, stitch-bonding machines of the type "Maliwatt" from the company Karl Mayer, formerly Malimo, are known.

Starting materials envisaged for the textile backing are, in particular, polyester fibres, polypropylene fibres or cotton fibres. The present invention, however, is not restricted to the aforementioned materials; rather, a large number of further fibres can be used to produce the web. The basic fibres of the web consist preferably of virgin or reclaimed polyester fibres. These fibres should be between 10 and 100 mm long and should have a linear density of from 1.5 to 5 dtex.

Needled, wet-laid or air and/or water jet consolidated webs can be obtained, for example, from Freudenberg.

As the fusible fibres of the web it is preferred to employ homopolymer and copolymer fibres, amorphous, undrawn or bicomponent fibres. They are used as binding fibres for consolidating webs, by virtue of the fact that, by thermal plastication and cooling, they bond and fix the intersections of the backing fibres. Bicomponent fibres consist of a fibre core which softens or melts at higher temperatures than the other component of the fibres, which, as the sheath, can be configured symmetrically or asymmetrically around the harder core or else in other geometries, such as side-by-side configurations. Further details can be read, inter alia, in technical books such as "Vliesstoffe" (Georg Thieme Verlag, Stuttgart, 1982) or "Textiltechnik" (Arbeitgeberkreis Gesamttextil, Eschborn, 1996).

Such fibres of the web consist in particular of polypropylene and/or polyethylene and also mixtures or copolymers thereof. In addition to polyolefins it is also possible to employ similarly, if required, fusible fibres based, for example, on polyester or polyamide.

For sufficient thermal bonding, generally from 10% to 30%, in particular 20%, of the fibres of the web are fusible fibres, especially fusible bicomponent fibres. The fusible fibres should, furthermore, be of the same order of magnitude in terms of linear density and length as the other fibre material.

The mechanically preconsolidated or wet-laid web is thermally bonded at a temperature above the softening point of the hot-melt adhesive component, the upper temperature and the dwell time being chosen such that the other polymer material of the other fibres undergoes no marked softening, let alone melting. For this purpose it is possible to choose temperatures from 120° C. to 300° C. (preferably from 120° C. to 200° C. and, with very particular preference, from 130° C. to 160° C.). Heating of the web causes the fusible fibres to flow viscidly, so that, at the contact points between the fusible fibres themselves and between the fusible fibres and the other fibres, there is wetting and an enlargement in the contact area extending to the point of coalescence, which results in a strong bond. The number and extent of the bonds can be controlled not only by appropriate selection of the polymer and of the fibre type but also, during thermal treatment, by the temperature, the period of time and, possibly, the application of pressure. Given an appropriate selection of polymer, the required energy may in principle also be provided by ultrasound, high-frequency radiation or the like.

As a result of the thermal treatment, volatile components such as fibre assistants are removed in the course of thermal bonding, giving a web having favourable fogging values, so that when a low-fogging adhesive composition is used it is possible to produce an adhesive tape having particularly advantageous fogging values.

FIG. 1 shows on the left-hand side a web 1 whose fibres 2 (mixture of 80% reclaimed polyester fibres and 20% fusible bicomponent fibres) have been consolidated mechanically, namely by means of water jets. The right-hand side shows a web 1 which has received an additional thermal consolidation. The fusible fibres 3 form bridges 4 with one another and also to the reclaimed polyester fibres.

By means of the nature, proportion and distribution of the fibre components in the staple fibre web it is possible to influence not only the delamination resistance and binding of the individual fibres into the web assembly but also the properties such as flexural rigidity, strength, damping character and surface texture, to name but a few, and the ultimate character of the web is critically determined thereby.

Further treatments, such as impregnation, calendering, coating and the production of composite materials with other backings (films, foils, spunbonded webs, scrims, wovens or the like), round off the possibilities for use.

By means in particular of controlled calendering with embossed rolls, it is possible to give the web a structure which not only makes it possible to establish specific surface textures but may also significantly enhance the capacity for sections of the tape to be torn off by hand (manual tearability).

In one preferred embodiment the web has the following properties:
- a web weight of from 60 to 400 g/m ,in particular 200 g/m$^2$,
- a web thickness of from 100 to 3000 μm, in particular from 500 to 1000 μm,
- a breaking strength of 75 N/(5 cm) to 500 N/(5 cm), in particular 175 N/(5 cm),
- a breaking extension of from 20% to 100%, in particular from 60% to 70%.

In order to give the adhesive tape of the invention properties optimized to the particular intended application, further additives can be added to the web backing during the production operation. Commercially customary UV stabilizers enhance the stability of the adhesive tape in the face of intense UV exposure from, for example, the sun. Particularly noteworthy in the case where the adhesive tape is used to bandage cable harnesses is the property whereby the adhesive tape is flameproofed by the addition of, preferably, ammonium polyphosphate and/or the selection of suitable fibres of low flammability. Through the targeted use of coloured fibre material it is possible to manufacture a large number of different-coloured webs.

With further preference, the web backing is coated on one side with a self-adhesive composition which may in particular consist of a commercially customary pressure-sensitive adhesive composition based on acrylate or rubber.

An adhesive composition which has proven to be particularly advantageous is one based on an acrylate hot melt having a K value of at least 20, in particular more than 30, obtainable by concentrating a solution of such a composition to give a system which can be processed in hot melt form.

This concentration can take place in appropriately equipped vessels or extruders; in the case of the associated devolatilization, a devolatilizing extruder is particularly preferred.

An adhesive composition of this type is set out in German Patent Application DE 43 13 008. In an intermediate step, the solvent is completely removed from these acrylate compositions produced in this way.

In addition, further highly volatile constituents are removed in the course of this process. After coating from the melt, these compositions still have small fractions of volatile constituents. It is therefore possible to use any of the monomers/recipes claimed in the abovementioned patent. A further advantage of the compositions described in the patent is that they have a high K value and hence a high molecular weight. The skilled worker is aware that systems having high molecular weights can be more efficiently crosslinked. Therefore, the fraction of volatile constituents falls correspondingly.

The solution of the composition can contain from 5 to 80% by weight, in particular from 30 to 70% by weight, of solvents. It is preferred to use commercially customary solvents, especially low-boiling hydrocarbons, ketones, alcohols and/or esters.

With further preference, single-screw, twin-screw or multiscrew extruders having one or, in particular, two or more devolatilizing units are employed. In the adhesive composition based on acrylate hot melt it is possible to incorporate benzoin derivatives by polymerization, examples being benzoin acrylate or benzoin methacrylate, or acrylic or methacrylic esters. Benzoin derivatives of this kind are described in EP 0 578 151.

Alternatively, the acrylate hot melt-based adhesive composition can be chemically crosslinked.

In one particularly preferred embodiment the self-adhesive compositions employed are copolymers of (meth) acrylic acid and esters thereof with from 1 to 25 carbon atoms, maleic, fumaric and/or itaconic acid and/or esters thereof, substituted (meth)acrylamides, maleic anhydride and other vinyl compounds, such as vinyl esters, especially vinyl acetate, vinyl alcohols and/or vinyl ethers.

The residual solvent content should be below 1% by weight.

The coating of the adhesive side of the backing, in particular with a self-adhesive coating, takes place in a conventional manner. The coating is advantageously conducted conventionally with coater bars and solvent compositions, but even better in a contactless or virtually contactless manner by means of screen printing technology (compare DE-C 33 46 100), in which case it is possible to conceive of a coating of adhesive over the full area or else in the manner of segments. In terms of the favourable parameters, express reference is made to the aforementioned Patent DE-C 33 46 100, in particular with respect to the viscosity and nature of the adhesive, to the screens used, sheet speeds and other measures.

Alternatively it is possible to employ transfer coating, preferably by means of a rolling-rod die applicator, in particular for a very wide variety of hot melt adhesives. This technology enables a substrate to be coated with a very small amount of adhesive composition. This may be advantageous, since the adhesive composition which otherwise sinks in the backing not only constitutes a waste of material but may even have an adverse effect on the damping properties of the adhesive tape in the course of use.

If coating on only one side is intended, this is done in particular, in the case of a stitched web, on the rougher, fibrous side, since this promotes the anchoring of the adhesive composition to the web and at the same time facilitates unwinding from a spiral roll.

In the case of needled or water jet consolidated webs, both sides of the web are usually equivalent in accordance with the common production techniques; in this case, there is no preferred side.

In the case of specific applications such as, for example, in the bandaging of cable harnesses, the coating of the reverse of the adhesive tape can be omitted entirely.

Depending on the target applications, the adhesive coating may be accompanied by an antiadhesive treatment to the reverse of the web backing. This additional coating of the second backing side can be undertaken with film-forming polymers, especially with acrylate varnish, or with a combination of foam or paste and varnish.

The backing can preferably be coated by the process described below. If coating of the backing with foam and varnish is intended, an acrylate dispersion foam is first of all applied to the backing material by the bar coater method. The resultant intermediate product is subsequently calendered, causing densification and crosslinking of the foam layer, before a varnish layer is applied atop the foam layer, likewise by the bar coater method.

The use, in accordance with the invention, of the fibre mix for the production of the web results in a marked consolidation of the material in the "z direction" without adversely affecting the damping effect of the adhesive tape produced therewith.

In addition to the thermal consolidation of the web, the contact points between the individual fibres in the assembly are firmly joined to one another by melting so that the web does not split when the tape is unwound from the roll. Since the individual fibres are also attached to the surface in this way, fibre tearout occurs only to a greatly restricted extent if at all.

The adhesive tape of the invention exhibits an outstanding damping quality. This can be attributed to the particular structure of the web of the invention: a high proportion of air is included between the individual adhesive tape layers in the course of adhesive bonding, and this air is able to provide very good cushioning against external vibrations. A bandage comprising the adhesive tape of the invention therefore exhibits a high flexibility within the individual wraps, which likewise has a positive effect on the damping properties.

The production of the adhesive tape of the invention is described below in exemplary embodiment without thereby wishing to restrict the invention in any way whatsoever.

EXAMPLE 1

A natural rubber/resin/petroleum spirit adhesive composition is applied to a thermally bonded web backing having a basis weight of 200 g/m$^2$ of whose fibres 80% consist of reclaimed polyester fibres and 20% of fusible bicomponent fibres, and which can be obtained from Naue Fasertechnik GmbH, on a suspension apparatus by the bar coater method with a sheet speed of 50 m/min. Drying on the suspension apparatus is completed at a temperature of 60° C. The other side of the backing web is coated with an acrylate dispersion foam (water content: 50% by weight) first of all in a tenter dryer in one coat by the bar coater method, the bar coater being disposed at a position of 25° relative to the zenith of the lower coating roll. The preliminary product is initially dried at an average temperature of 120° C. and then calendered in-line at a temperature of from 150° C. to 180° C. under a pressure of 10 tonnes.

EXAMPLE 2

A staple fibre web comprising 80% polyester fibres and 20% fusible copolymer fibres is consolidated in a customary production-line water jet consolidation unit.

The uniform distribution of the fibres employed ensures a homogeneous distribution of the fusible copolymer fibres in the consolidated web, so that in the subsequent thermal bonding process the uniform melt-contacting of the points of contact between polyester fibres and fusible fibres ensures that the sheetlike structure has a firm hold.

The resultant consolidation of the web ensures the desired delamination resistance and single-fibre fixing, and also tends to enhance the manual tearability. A web as described above is coated on one side with an adhesive composition in a customary coating unit.

EXAMPLE 3

A web of consolidated by needling, with a PP fibre fraction of 20% and a polyester fibre fraction of 80%, is calendered in an embossing calender at 150° C. under a pressure of 25 tons. The textured surface which results offers, for use as an adhesive tape, on the one hand the advantage of the thermal consolidation (no fibre tearout, delamination resistance, and manual tearability) and on the other hand a structure of valleys and hills, which facilitate unwinding from the roll.

What is claimed is:

1. A method for bandaging a cable harness, comprising the step of applying to the cable harness an adhesive tape having a tapelike backing of nonwoven material, coated on at least one side with an adhesive, the nonwoven web being a staple fibre web which is mechanically consolidated or wet-laid, between 2% and 50% of the fibres of the web being fusible fibres, the web having the following properties:

- a web weight of from 200 g/m² to 400 g/m²,
- a web thickness of from 100 µm to 3000 µm,
- a breaking strength of 75 N/(5 cm) to 500 N/(5 cm), and
- a breaking extension of from 20% to 100%.

2. The method of claim 1, wherein the fusible fibres of the web consist of homopolymer, copolymer or bicomponent fibres having a relatively low softening or melting point.

3. The method of claim 1, wherein the fusible fibres of the web consist of polypropylene, polyethylene, polyamide, polyester or copolymers.

4. The method of claim 1, wherein from 10 to 30% of the fibres of the web are fusible fibres.

5. The method of claim 1, wherein the web is coated on one side with a self-adhesive composition.

6. The method of claim 1, wherein the adhesive coating consists of a commercially customary pressure-sensitive adhesive composition based on acrylate or rubber.

7. The method of claim 1, wherein the reverse of the web has been antiadhesively treated.

8. The method of claim 1, wherein one or more additives such as pigments or UV stabilizers have been added to the web.

9. The method of claim 1, wherein the adhesive tape has been flameproofed.

* * * * *